US006496339B2

(12) United States Patent
Sugawara et al.

(10) Patent No.: US 6,496,339 B2
(45) Date of Patent: Dec. 17, 2002

(54) ELECTRIC POWER SUPPLY DEVICE AND EQUIPMENT USING THEREOF

(75) Inventors: Wataru Sugawara, Oohira (JP); Toshio Shimada, Fujioka (JP); Shigeya Kawaminami, Oohira (JP); Masahiko Niino, Tougou (JP)

(73) Assignees: Hitachi, Ltd., Tokyo (JP); Yamada Electric Mfg. Co. Ltd., Nagoya (JP)

( * ) Notice: Subject to any disclaimer, the term of this patent is extended or adjusted under 35 U.S.C. 154(b) by 0 days.

(21) Appl. No.: 09/862,233

(22) Filed: May 23, 2001

(65) Prior Publication Data

US 2002/0018326 A1 Feb. 14, 2002

(30) Foreign Application Priority Data

May 23, 2000 (JP) ....................................... 2000-155948

(51) Int. Cl.[7] .................................................. H02H 5/04
(52) U.S. Cl. ......................................................... 361/32
(58) Field of Search .............................. 361/23, 30, 31, 361/32, 33, 34, 105

(56) References Cited

U.S. PATENT DOCUMENTS 4,387,412 A * 6/1983 Woods et al. ................. 361/27
5,021,915 A * 6/1991 Wandler et al. ............... 361/26
5,497,286 A * 3/1996 Shimada et al. ............ 361/105

FOREIGN PATENT DOCUMENTS

JP 63-55588 * 4/1988
JP 05-128948 * 5/1993

* cited by examiner

*Primary Examiner*—Matthew Nguyen
(74) *Attorney, Agent, or Firm*—Antonelli, Terry, Stout & Kraus, LLP

(57) ABSTRACT

An electric power supply device 13, combining an overload protector device 3 and a starter device 4 each other, and an equipment using thereof comprises a socket terminal 5 connected to an electric part of the overload protector device 3, and a convex portion 10*c* opposing to a tip opening portion 5*a* of the socket terminal 5, which is nearly in conformity with the shape of that tip opening portion and has a little gap therebetween, wherein while keeping superiority in work of assembling external apparatuses onto the terminal pins, prying force caused onto the tip opening portion when the socket terminals of the starter device are fitted onto terminal pins of an external equipment is suppressed, thereby to improve reliability.

8 Claims, 7 Drawing Sheets

ELECTRIC POWER SUPPLY DEVICE AND EQUIPMENT USING THEREOF

BACKGROUND OF THE INVENTION

1. Field of the Invention

The present invention relates to an electric power supply device and an equipment using thereof, and in particular to the electric power supply device and the equipment using thereof, being suitable for use in a refrigerator or such appliances, etc.

2. Description of Prior Art

Conventionally, an electric equipment comprising a positive characteristic thermistor device and an overload relay is already known, as described in for example Japanese Utility-model Laying-Open No. Sho 63-55588 (1987) <Conventional art 1>.

The electric part of this conventional art 1 is constructed by attaching a first exterior case storing the positive characteristic thermister element therein onto a second exterior case storing the overload relay therein, and its electrical connections and mounting are achieved by fitting portions of external connector terminals of the first exterior case and the external connector terminals of the second exterior case onto the three (3) pieces of pins of hermetic terminals of a sealed container. Each the external connector terminal is bent from an outside into an inside, and has an opening portion at the tip thereof.

Also, an overload protector device and a starter device for a closed type compressor used in the conventional freezer refrigerator, etc., are known, as described in Japanese Patent Laying-Open No. Hei 5-128948 (1993) <Conventional art 2>.

In this conventional art 2 is disclosed the overload protector device, wherein a first case and a second case make up a case, in which a heater and a bi-metal are stored, and a spring terminal to be connected to the heater is disposed to be stored in a projection portion, which is formed in an outside of the above-mentioned second base. This spring terminal has a shape of a rough triangle in the cross-section thereof, being bent from the outside into the inside, and also has an opening at the tip thereof. And, the starter device of this conventional art 2 is that which is indicated only by "PTC RELAY" in a circuit of a compressor motor.

However, while, in the conventional art 1, it is disclosed that the electric part constructed by attaching the second exterior case onto the first exterior case is attached to pins of the hermetic terminals of the sealed container, no disclosure is made on a point of view improve reliability thereof by protecting the fitting portions of the external connector terminals from prying force applied thereon when fitting them onto the pins of the hermetic terminals of the sealed container.

Also, in the conventional art 2, it is disclosed that the spring terminal is stored in the projection portion, which is formed in the outside of the second case of the overload protector, however the projection portion is not extended up to an outside of the opening at the tip of the spring terminal, and the outside of the opening at the tip of the spring terminal is opened, therefore no disclosure is made on protection of the opening at the tip of that spring terminal.

SUMMARY OF THE INVENTION

An object, according to the present invention, is to provide an electric power supply device and an equipment using thereof, wherein while keeping superiority in work of assembling external apparatuses onto the terminal pins thereof, the prying force applied onto the opening at the tip of socket terminals of the overload protector when they are fitted onto terminal pins of an external equipment can be suppressed, thereby achieving high reliability.

First, according to the present invention, for accomplishing the above-mentioned object, there is provided an electric power supply device, comprising: an overload protector device; and a starter device being connected with said overload protector device, wherein: said overload protector device has a case, in which are stored electric parts, including a bi-metal and a heater, and a socket terminal being connected to those electric parts, to be fitted with a terminal pin of an external device, wherein said socket terminal is bent from both sides to be formed in nearly triangle-like shape in cross-section thereof, and has a tip opening portion being in nearly conformity with a shape of a pin of an external terminal; said starter device has a case, in which is stored a positive characteristic thermistor, and a pair of socket terminals being connected to said positive characteristic thermistor, to be fitted with other terminal pins of said external device; and a receiving portion is provided opposing to a tip opening portion of the socket terminal of said overload protector device, being in nearly conformity with shape of that tip opening portion and having a little gap therebetween.

Second, according to the present invention, in the electric power supply device as defined in the above, wherein the socket terminal of said overload protector device is formed to be elongated, while said receiving portion is formed along with all over length of said socket terminal in longitudinal direction thereof.

Third, according to the present invention, in the electric power supply device as defined in above, wherein said receiving portion is formed with portion projecting on a side surface of the case of said starter device.

Fourth, according to the present invention, in the electric power supply device as defined in the above, wherein connection portions, each being in an about "L" shape, are formed extending vertically on a side surface of the case, locating on both sides of the socket terminal of said overload protector device, wile connection portions, each being in an about "L" shape, are formed extending vertically on a side surface of the case of said starter device corresponding to the connection portions formed on the side surface of said overload protector device, and the connection portions of said overload protector device and the connection portions of said starter device are combined by sliding them in vertical direction.

Fifth, according to the present invention, in the electric power supply device as defined in the above, wherein connection portions are formed extending vertically on a side surface of the case, locating on both sides of the socket terminal of said overload protector device, and said receiving portion is formed by an enclosure portion which connects between the connection portions of said overload protector device.

Sixth, according to the present invention, in the electric power supply device as defined in above, wherein said receiving portion is formed in a shape, so as to correspond with one side of the tip opening portion of the socket terminal, to which said projection portion formed by the portion projecting on one side surface of the case of said starter device.

Seventh, according to the present invention, in the electric power supply device as defined in the above, wherein a stopper portion is formed on at lease one of the connection portions of said overload protector device and said starter device.

And eight, according to the present invention, there is provided an equipment, comprising: a main body of the equipment having a motor therein; and an electric power supply device, to be connected with said main body of the equipment, wherein said main body of the equipment has terminal pins, and said electric power supply device is constructed by connecting an overload protector device and a starter device, wherein: said overload protector device has a case, in which are stored electric parts, including a bi-metal and a heater, and a socket terminal being connected to those electric parts, to be fitted with a terminal pin of an external device, wherein said socket terminal is bent from both sides to be formed in nearly triangle-like in cross-section thereof and has a tip opening portion being nearly in conformity with a shape of a pin of an external terminal; said starter device has a case, in which is stored a positive characteristic thermistor, and a pair of socket terminals being connected to said positive characteristic thermistor, to be fitted with other terminal pins of said external device; and a receiving portion is provided opposing to a tip opening portion of the socket terminal of said overload protector device, being in nearly conformity with shape of that tip opening portion and having a little gap therebetween.

DESCRIPTION OF PREFERRED EMBODIMENTS

Figure 1:
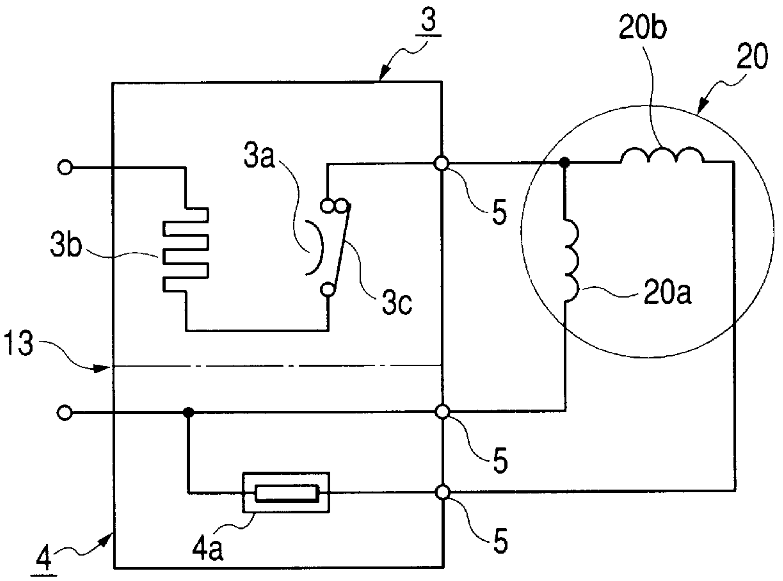
FIG. 1 is an electric circuit diagram of a single-phase induction motor used in a first embodiment, according to the present invention.

Hereinafter, embodiments according to the present invention will be fully explained by referring to the attached drawings. Reference numerals given in common with the respective embodiments indicate the same elements or the corresponding ones.

First, explanation will be given on a first embodiment according to the present invention, by referring to FIGS. 1 to 10.

First of all, explanation will be given on an electric circuit of a single-phase induction motor, which is used in the first embodiment of the present invention, by referring to FIG. 1. The FIG. 1 is the electric circuit diagram of the single-phase induction motor used in the first embodiment of the present invention.

A single-phase induction motor 20 has a main winding 20*a* and an auxiliary winding 20*b*, so that they are constructed to drive a closed type motor-operated compressor 1 which will be mentioned later.

An electric power supply 13 for providing power for the single-phase induction motor 20 has an overload protector device 3 and a starter device 4.

The overload protector device 3 has a bi-metal 3*a* and a heater 3*b*, being connected in series with the single-phase induction motor 20. The connection between both of them is conducted by fitting a pin 2*b* of a plug terminal 2 into a socket terminal 5 of the overload protector device 3, as will be mentioned later. And, when over current flows through the single-phase induction motor 20, the heater 3*b* generates heat therefrom, and that heat due to this heat generation is detected by the bi-metal 3*a*, thereby closing a switch portion 3*c* so as to protect the single-phase induction motor 20 from the over current.

The starter device 4 has a positive characteristic thermistor 4*a* connected in series to the auxiliary winding 20*b*. The connection of this starter device 4 and the single-phase induction motor 20 is conducted through the fitting of the pin 2*b* of the plug terminal 2 into the socket terminal 5 of the starter device 4, as will be mentioned later. And, by the function of this positive characteristic thermistor 4*a*, the well-known single-phase induction motor 20 is started up.

Next, explanation will be given on the above-mentioned overload protector device 3 by referring to FIGS. 2 and 3. The FIG. 2 is the perspective view of the overload protector device used in the first embodiment of the present invention, and the FIG. 3 the bottom plane view of the overload protector device shown in the FIG. 2.

The overload protector device 3 has a thin box-like case 30 formed by combining an exterior case 11 and a cover 6 detachably, both of which are manufactured through injection molding of synthetic resin, and within the case 30 is stored a switch portion 3*c* together with the bi-metal 3*a* and the heater 3*b*. Also, this overload protector device 3 has a socket terminal 5 to be fitted onto the pin 2*b* of the plug terminal 2 provided on an outer shell la of the closed type motor-operated compressor 1 (see FIG. 9), for achieving electrical connection and mounting thereof onto the pin 2*b* at the same time. This socket terminal 5 is provided only one piece at the position corresponding to the pin 2*b* of the plug terminal 2.

Figure 2:
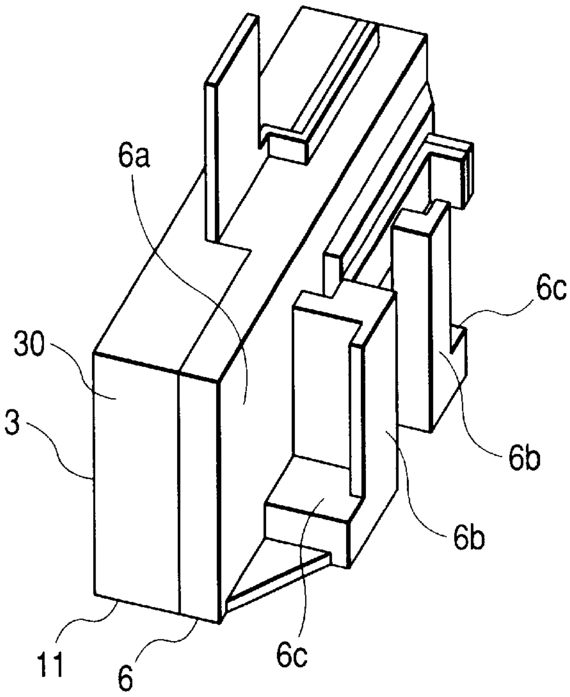
FIG. 2 is a perspective view of an overload protector device used in the first embodiment, according to the present invention.

The above-mentioned cover 6 is, as shown in the FIG. 2, formed with a pair of connection portions 6*b* and 6*b* in one body, each extending vertically on a side external wall surface 6*a* thereof and having an "L" shaped cross-section.

At the lower end portions of those connection portions 6*b* and 6*b* is formed a stopper portion 6*c*. Also, an internal distance between those connection portions 6*b* and 6*b* is so set that a bottom portion of the socket terminal 5 can be positioned on the external wall surface 6*a* side to be stored therein.

The above-mentioned socket terminal 5 is formed from a conductive spring material, such as, copper, copper alloy, stainless steel plated with conductive metal material, etc., and both sides thereof are bent round from the outside into the inside thereof each other, so that the pin 2*b* of the plug terminal 2 can be put between them, thereby forming a nearly triangle shape in the cross-section thereof. A tip opening portion 5*a* bent around forms an arc-like shape, so that it is nearly in conformity with the column shape of the pin 2*b* of the plug terminal 2.

Figure 3:
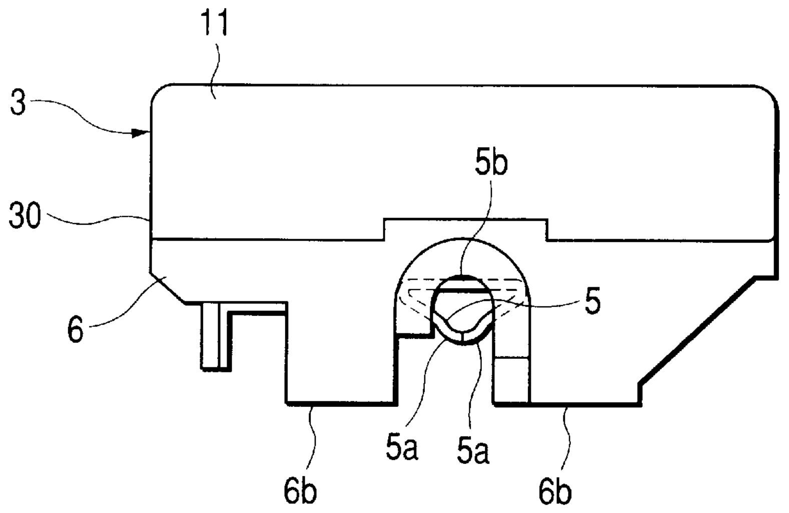
FIG. 3 is a bottom plane view of the overload protector device shown in the FIG. 2.

Also, as shown in FIG. 3, this socket terminal 5 is so disposed that a bottom surface side 5*b* of the nearly triangle shape comes in contact with along the external wall surface 6*a* of the cover 6 of the overload protector device 3, while the tip opening portion 5*a* on the opposite side thereof, and it is enclosed by the external wall surface 6*a* of the cover 6 and the connection portions 6*b* and 6*b* in three (3) directions of surrounding thereof, except for the tip opening portion 5*a* side. This socket terminal 5 is formed to extend in the vertical direction, so as to keep sufficient contact area between the pin 2*b* of the plug terminal 2.

Figure 4:
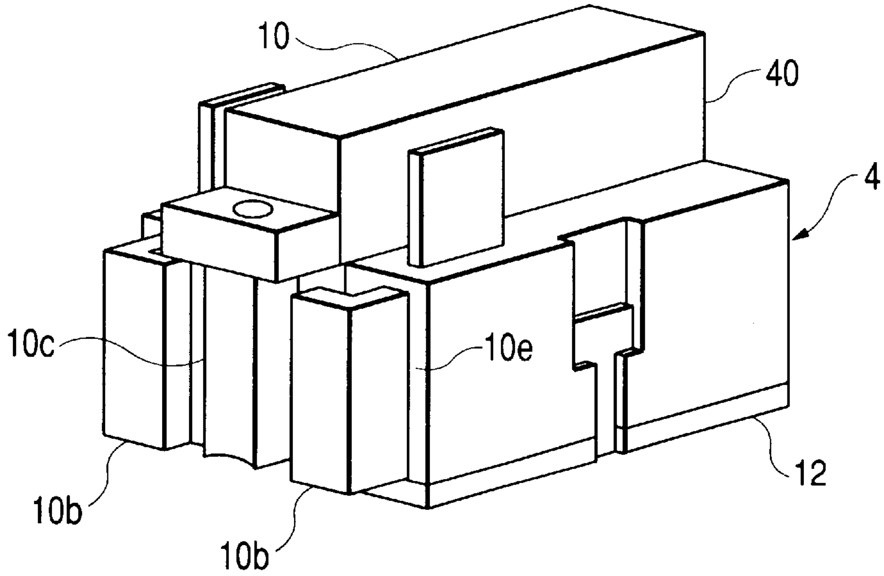
FIG. 4 is a perspective view of a starter device used in the first embodiment, according to the present invention.

Next, explanation will be given on the starter device mentioned above, by referring to FIGS. 4 and 5. The FIG. 4 is a perspective view of the starter device used in the first embodiment, according to the present invention, and the FIG. 5 is a bottom plane view of the starter device shown in the FIG. 4.

The starter device 4 has a box-like case 40 formed by combining an exterior case 10 and a cover 12 detachably, both of which are manufactured through injection molding of synthetic resin, and within the case 40 is stored the positive characteristic thermistor 4*a*. Also, this starter device 4 has socket terminals 5 to be fitted onto the pins 2*b* of the plug terminal 2 provided on the outer shell 1*a* of the closed type motor-operated compressor 1 (see FIG. 9), for achieving electrical connection and mounting thereof onto the pins 2*b* at the same time. The socket terminals 5 are provided in a pair at the positions corresponding to the pins 2*b* and 2*b* of the plug terminal 2.

Each the socket terminal 5 is formed from a conductive spring material, such as, copper, copper alloy, stainless steel plated with conductive metal material, etc., and both sides thereof are bent round from the outside into the inside thereof each other, so that the pin 2*b* of the plug terminal 2 can be put between them, thereby forming a nearly triangle shape in the cross-sect ion thereof.

Figure 5:
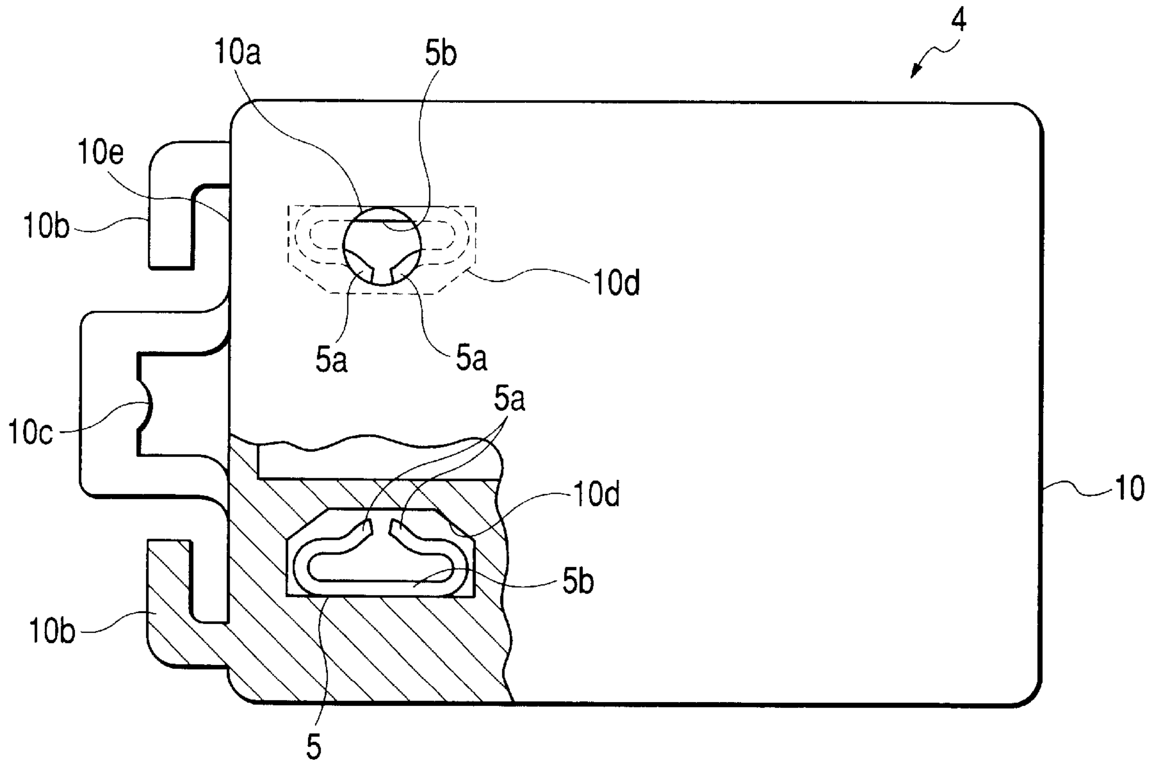
FIG. 5 is a bottom plane view of the starter device shown in the FIG. 4.

Also, those sockets 5 are stored into spaces within a pair of terminal receiving portions 10*d* and 10*d* formed in the exterior case 10, as shown in FIG. 5, and are disposed so that each the bottom surface portion 5*b* of the nearly triangle shape comes in contact with an interior wall surface of the terminal receiving portions 10*d* while the tip opening portions 5*a* and 5*a* are opposite to each other. The plug terminal 5 is surround by the interior wall surface of the terminal receiving portions 10*d* of the exterior case 10. Further, the terminal receiving portions 10*d* and 10*d* are provided at the positions corresponding to the pins 2*b* and 2*b* of the plug terminal 2, and are connected to an outside through penetrating bores 10*a* and 10*a* formed corresponding to the pins 2*b* and 2*b* of the plug terminal 2. Insertion of the pins 2*b* and 2*b* of the plug terminal 2 into the socket terminals 5 is conducted through those penetrating bores 10*a* and 10*a*.

On the exterior case 10 mentioned above, a pair of connection portions 10*b* and 10*b* is provided at the positions corresponding to the connection portions 6*b* and 6*b*, which are provided on the overload protector device 3 mentioned above, so that they surrounds the above-mentioned connection portions 6*b* and 6*b*. In more details, this exterior case 10 is formed with the pair of connection portions 10*b* and 10*b* in one body, each extending vertically on a side external wall surface 10*e* thereof and having an "L" shaped cross-section.

Also, on this exterior case 10 is provided a convex portion 10*c* at the position opposing to the socket terminal 5 of the overload protector device 3. In more details, this exterior case 10 is formed with the convex portion 10*c* vertically extending on the side external wall surface 10*e* thereof on one body. This convex portion 10*c* has an arc-like shape, so that it is nearly in conformity with the shape of the tip opening portion 5*a* of the socket terminal 5 when the connection portion 6*b* of the overload protector device 3 mentioned above and the connection portion 10*b* of the starter device 4 are combined with, and further it is provided with a gap, so as to absorb expansion in sizes when the pin 2*b* of the plug terminal 2 is inserted into the above-mentioned socket terminal 5 and to be a little bit larger than that, thereby forming a receiving portion for the tip opening portion 5*a* of the socket terminal 5. This convex portion 10*c* is formed over the length of the portion of the socket terminal 5 fitting onto the pin 2*b* of the plug terminal 2.

This convex portion 10*c* is formed to project from the side external wall surface 10*e* of the exterior case 10, therefore the case 10 can be formed with the convex portion 10*c* in one body, with using the existing metallic mold for injection molding, which has no portion corresponding to this convex portion 10*c*, but by cutting off that portion corresponding thereto.

Next, explanation will be given on an electric power supply device combining the overload protector device 3 and the starter device 4 mentioned above together, by referring to FIGS. 6 to 8. The FIG. 6 is a perspective view of the electric power supply device of the first embodiment, according to the present invention, the FIG. 7 is a bottom plane view of the electric power supply device shown in the FIG. 6, including a cross-section view of a part thereof, and the FIG. 8 is a view for showing a combining method of the electric power supply device shown in the FIG. 6.

Figure 6:
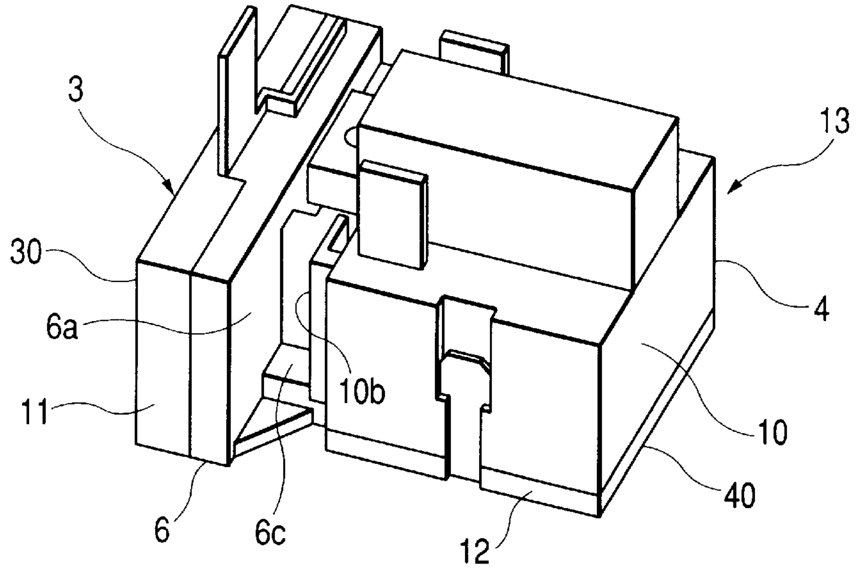
FIG. 6 is a perspective view of an electric power supply device of the first embodiment, according to the present invention.
Figure 7:
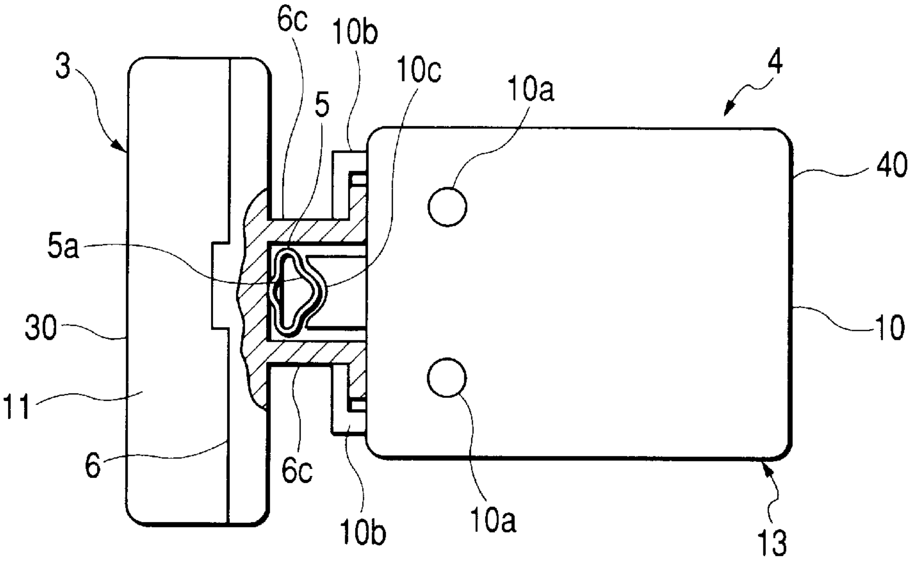
FIG. 7 is a bottom plane view of the electric power supply device shown in FIG. 6, including a cross-section view of a part thereof.
Figure 8:
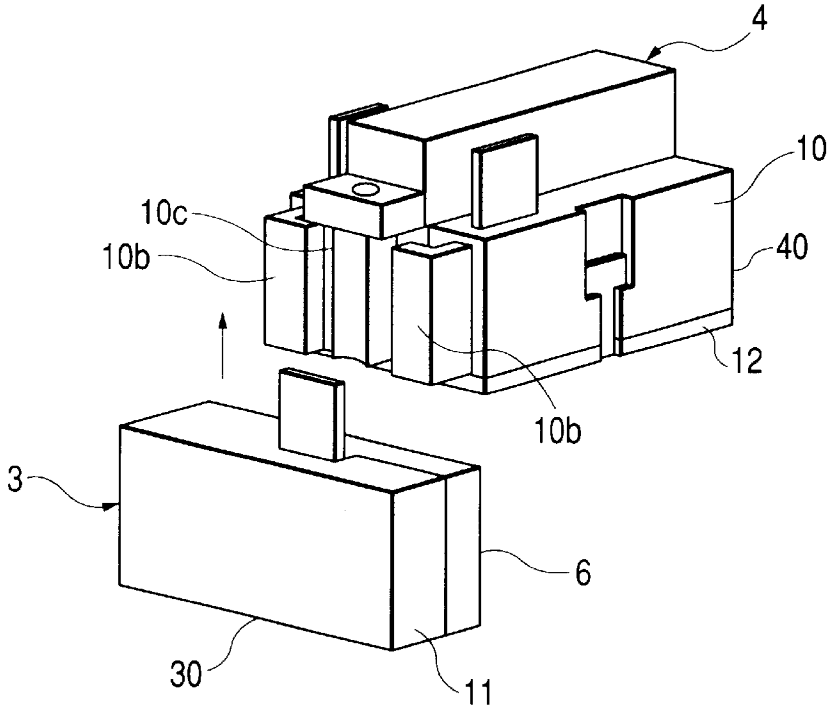
FIG. 8 is a view for showing a combining method of the electric power supply device shown in the FIG. 6.

The electric power supply device 13 shown in the FIGS. 6 and 7 is constructed by combining the overload protector device 3 and the starter device 4 mentioned above, together. The connection of the both 3 and 4 is achieved by combining the connection portion 6*b* of the overload protector device 3 and the connection portion 10*b* of the starter device 4. In more details of the combining method, as shown in FIG. 8, the overload protector device 3 is moved from below toward the starter device 4, so as to fit the connection portions 6*b* and 10*b* to each other, and is further moved up to a predetermined position by sliding thereof. Namely, the starter device 4 is shifted until when the lower end portion abuts or collides on the stopper portion 6*c* of the overload protector device 3, thereby completing the connection. In this manner, since the overload protector device 3 and the starter device 4 can be fitted to each other by sliding, the connection work can be performed very easily, and also since the respective connecting portions of the connection parts 6*b* and 10*b* can be elongated, therefore the connecting condition thereof can be maintained with certainty. Further, the starter device 4 may be moved from above toward the overload protector device 3.

With this electric power supply device 13, in an outside of the arc-like tip opening portion 5*a* of the socket terminal 5 is positioned the convex portion 10*c* having an arc-like surface nearly in conformity with the arc-like portion thereof, and a gap between the both 5*a* and 10*c* is so set, that it can absorb the expansion in sizes when the pin 2*b* of the plug terminal 2 is inserted into the above-mentioned socket terminal 5 and it is a little bit larger than that.

Figure 9:
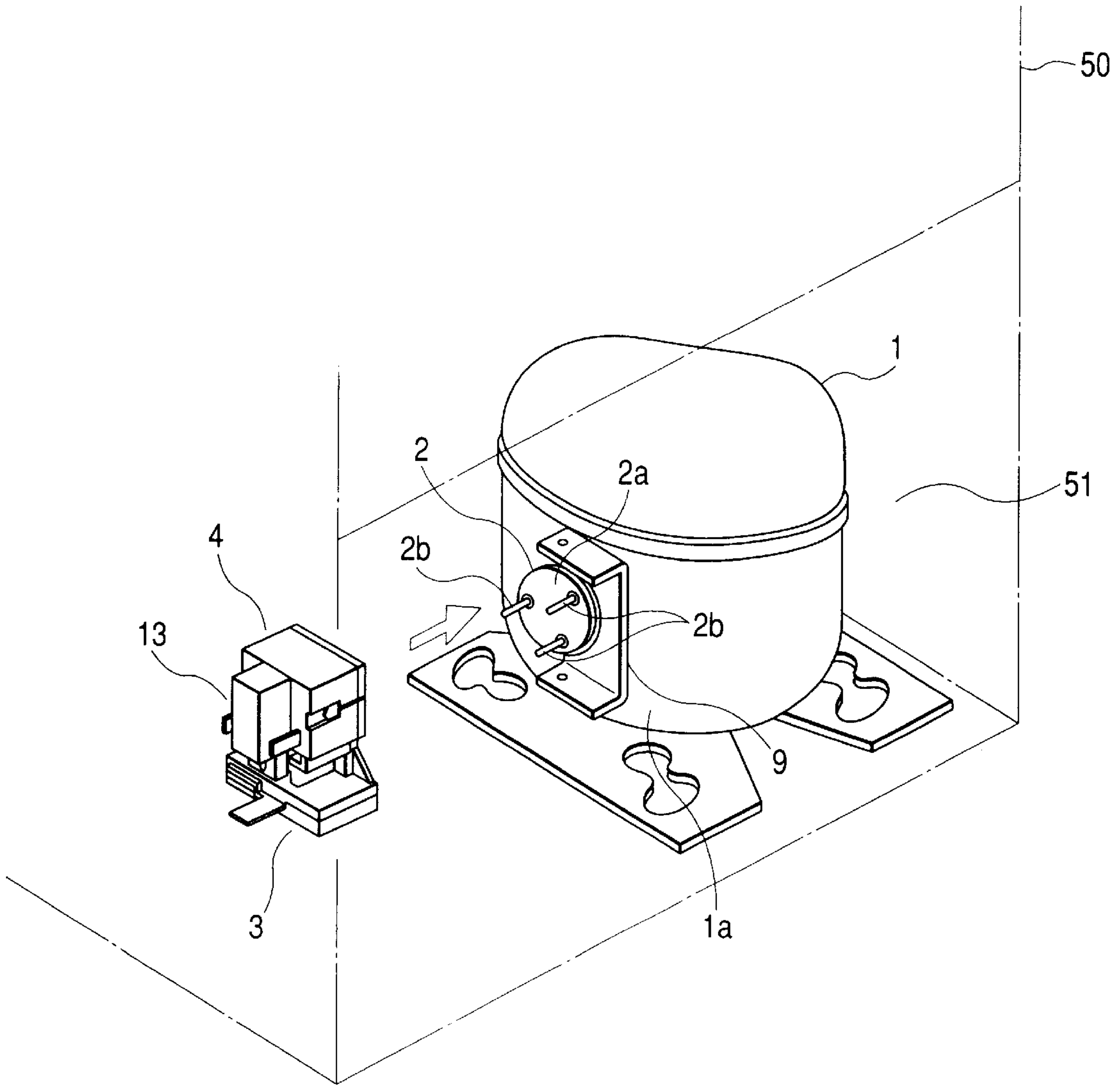
FIG. 9 is a perspective view when the electric power supply device of the first embodiment, according to the present invention, is attached onto a closed type motor-operated compressor.
Figure 10A:
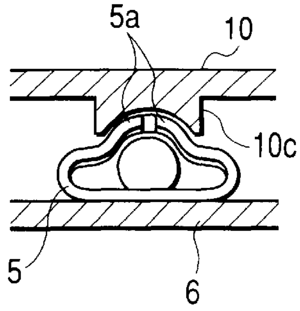
FIGS. 10(*a*) through 10(*h*) are cross-section views of a principle portion, for showing an example of transition in fitting between a socket terminal and a pin of a plug terminal under the condition when the electric power supply device shown in the FIG. 9 is attached onto the closed type motor-operated compressor, respectively.
Figure 10B:
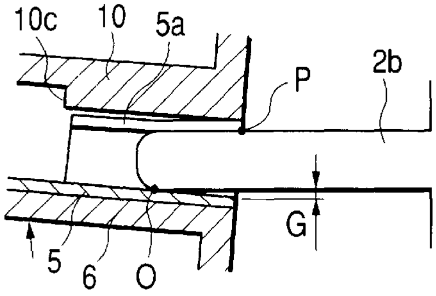
Figure 10C:
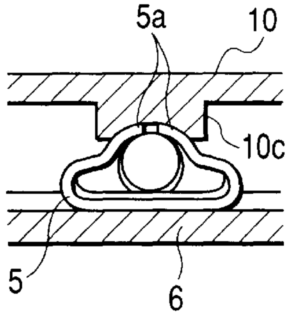
Figure 10D:
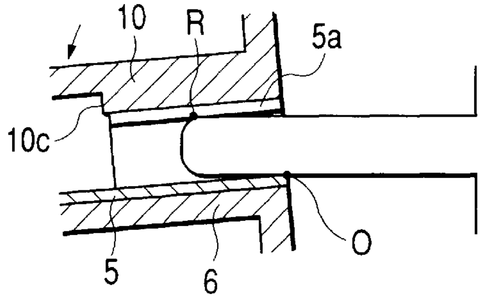
Figure 10E:
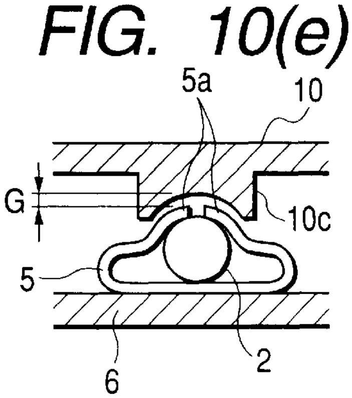
Figure 10F:
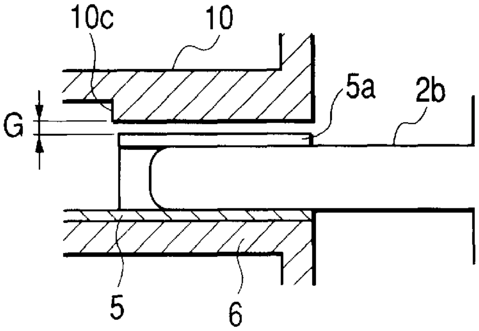
Figure 10G:
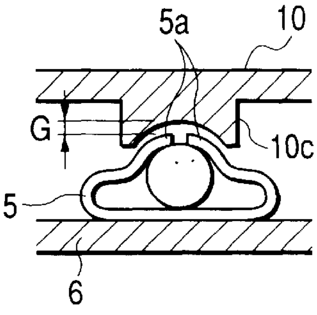
Figure 10H:
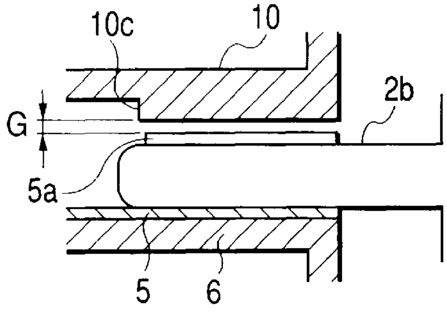

Next, explanation will be given on the method for attaching this electric power supply device 13 onto the closed type motor-operated compressor 1, by referring to FIGS. 9 to 10. The FIG. 9 is a perspective view when the electric power supply device of the first embodiment according to the present invention is attached onto the sealed-type motor-operated compressor, and the FIGS. 10(*a*) through 10(*h*) are cross-section views of a principle portion, for showing an example of transition in fitting between the socket terminal and the pin of the plug terminal under the condition when the electric power supply device shown in the FIG. 9 is attached onto the sealed type motor-operated compressor. Further, the FIGS. 10(*a*) and 10(*b*) show the views on the cross-sections perpendicular to the pin and in direction of the pin, as well, in particular under the condition where the electric power supply device is inclined upward with respect to the pin, respectively; the FIGS. 10(*c*) and 10(*d*) the views on the cross-sections perpendicular to the pin and in direction of the pin, as well, in particular under the condition where the electric power supply device is inclined downward with respect to the pin, respectively; the FIGS. 10(*e*) and 10(*f*) the views on the cross-sections perpendicular to the pin and in direction of the pin, as well, in particular under the condition where the electric power supply device is corrected in the inclination with respect to the pin, respectively; and the FIGS. 10(*g*) and 10(*h*) the views on the cross-sections perpendicular to the pin and in direction of the pin, as well, in particular under the condition where the electric power supply device is inserted onto the pin, respectively.

For the purpose of mounting or attaching the electric power supply device 13 onto the closed type motor operated compressor 1 in the condition where the overload protector device 3 and the starter device 4 are combined to each other, the electric power supply device 13 is inserted or pushed from the direction shown by an arrow in the FIG. 9 onto the pins 2*b* provided on the side surface of the closed type motor-operated compressor 1. With this, i.e., by inserting the socket terminal 5 provided on the overload protector device 3 and the socket terminals 5 provided on the starter device 4, simultaneously, to be fitted thereto, thereby achieving the electrical connection and the mounting of the electric power supply device 13 onto the plug terminals 2.

In this instance, the closed type motor-operated compressor 1 is disposed within a machine chamber 51 formed in a lower portion on a rear surface of a main body 50 of a refrigerator, thereby constructing a main body of the apparatus, to which the electric power supply device 13 is to be connected. This closed type motor-operated compressor 1 constructs a refrigerating cycle together with a compressor, a decompressor, an evaporator, etc., therefore there are provided piping or conduits for that purpose within the machine chamber 51, and further it is taken into a consideration that the machine chamber 51 comes to be a space as small as possible, for reducing sizes of an external shape of the main body 50 of the refrigerator. With this, the space within the machine chamber 51 is narrow in the space. Further, a terminal plate 9 is provided for attaching a cover (not shown in the figure) for covering over the electric power supply device 13 therewith.

Also, the plug terminals 2, having a case portion 2a as well as the three (3) pieces of the pins 2*b* projecting aside, are provided, in general, on a side surface of the closed type motor-operated compressor 1 in relation with wiring, etc., from the electric power supply device 13 to other apparatuses. Accordingly, attachment of the electric power supply device 13 onto the closed type motor-operated compressor 1 is performed by the following assembling work; i.e., the electric power supply device 13 is attached from a side within such the narrow machine chamber 51 by one hand while holding the exterior case 10 of the starter device 4 in that hand, therefore, it is difficult to insert the electric power supply device 13 with keeping it in the condition of being coincident with the projecting direction of the pins 2*b* of the plug terminal 2, thereby occurring the condition that the electric power supply device 13 is inclined.

Herein, explanation will be given on the prying force caused by the pin 2*b* due to the inclination of the electric power supply device 13 when the electric power supply device 13 is fitted onto the pins 2*b* of the plug terminal 2, in more details thereof, by referring to the FIGS. 10(*a*) through 10(*h*).

In the case where the electric power supply device 13 is inclined upward under the condition where the pins 2*b* are inserted into the socket terminals 5, as shown in the FIG. 10(*a*) and 10(*b*), a portion P of the tip opening portion 5*a* at an inlet side of the socket terminal 5 is pushed to open or pried by the pin 2*b* upon the supporting point or fulcrum of a point O. However, since the convex portion 10*c* is positioned in the outside of the tip opening portion 5*a* with a little gap opposing thereto, the portion P of the tip opening portion 5*a* is pushed to open a little bit but it abuts on the arc-like surface of that convex portion 10*c*. Accordingly, the portion P of the socket terminal 5 is prevented by the convex portion 10*c* from being pushed to open or pried more than the gap G, therefore deformation in the portion P of the socket 5 can be suppressed within elastic limits of the socket terminal 5 in an amount thereof, thereby enabling the protection of the socket terminal 5. Also, since the pin 2*b* is prevented from being inclined more than the condition having the inclination of a little bit with respect to the socket terminal 5, it is possible to suppress an increase of the prying force upon the socket terminal 5 due to the pin 2*b*, therefore it is possible to turn the pin 2*b* and the socket terminal 5 back to the condition shown in the FIGS. 10(*e*) and 10(*f*) by continuing the work for fitting therein.

Also, in the case where the electric power supply device 13 is inclined downward under the condition where the pins 2*b* are inserted into the socket terminals 5, as shown in the FIG. 10(*c*) and 10(*d*), a portion R of the tip opening portion 5*a* in a deep side of the socket terminal 5 is pushed to open or pried by the pin 2*b* upon the supporting point or fulcrum of a point Q. However, since the convex portion 10*c* is positioned in the outside of the tip opening portion 5*a* with a little gap opposing thereto, the tip opening portion 5*a* is pushed to open a little bit but it abuts on the arc-like surface of that convex portion 10*c*. With this, in the same manner as mentioned in the above, it is possible to obtain the protection of the socket terminal, and to obtain continuity in the fitting work between the pins 2*b* and the socket terminals 5, as well.

When the pin 2*b* is inserted into deep within the socket terminal 5, in this manner, as shown in the FIGS. 10(*e*) and 10(*f*), the fitting portion between the pin 2*b* and the socket terminal 5 comes to be long, therefore the both 2*b* and 5 are stable in the fitting, and then they can reach to final insertion condition shown in the FIGS. 10(*g*) and 10(*h*) with ease.

In this manner, the assembling work can be performed smoothly, while reducing the prying force, therefore it is possible to provide the electric power supply device 13 having high reliability therewith.

Figure 11:
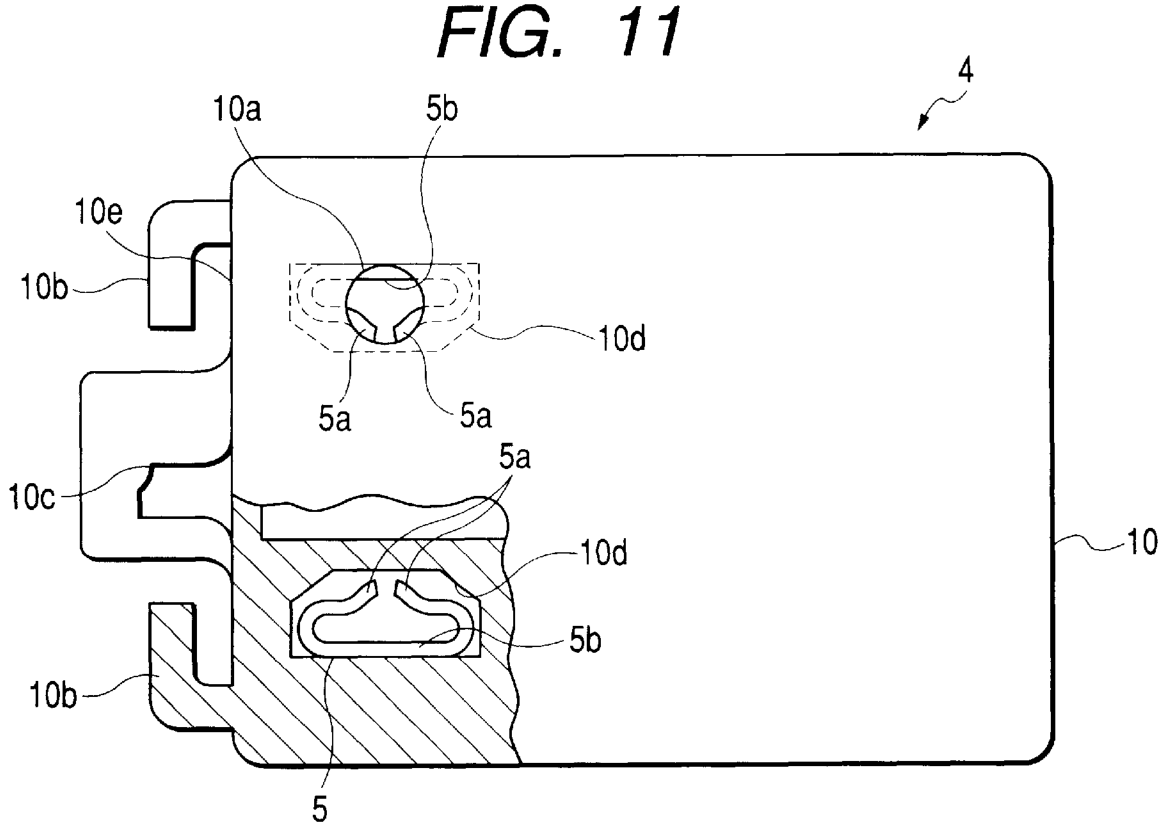
FIG. 11 is a bottom plane view of the starter device used in the electric power supply device of a second embodiment, according to the present invention, including a cross-section view of a part thereof.

Next, explanation will be given on a second embodiment of the present invention, by referring to FIG. 11. The FIG. 11 is a bottom plane view of the starter device used in the electric power supply device of the second embodiment, according to the present invention, including a cross-section view of apart thereof. However, in this second embodiment, the structures and duplicated explanations about the portions in common with those in the first embodiment are omitted.

In this second embodiment, the convex portion 10*c* is formed, so as to coincide with only one tip opening portion of the socket terminals 5 in the shape thereof.

With such the structure, it is possible to suppress the prying force occurring when the pins of the plug terminal are inserted into socket terminals 5, with utilizing the space on the side of the projection portion 10*c* effectively.

Figure 12:
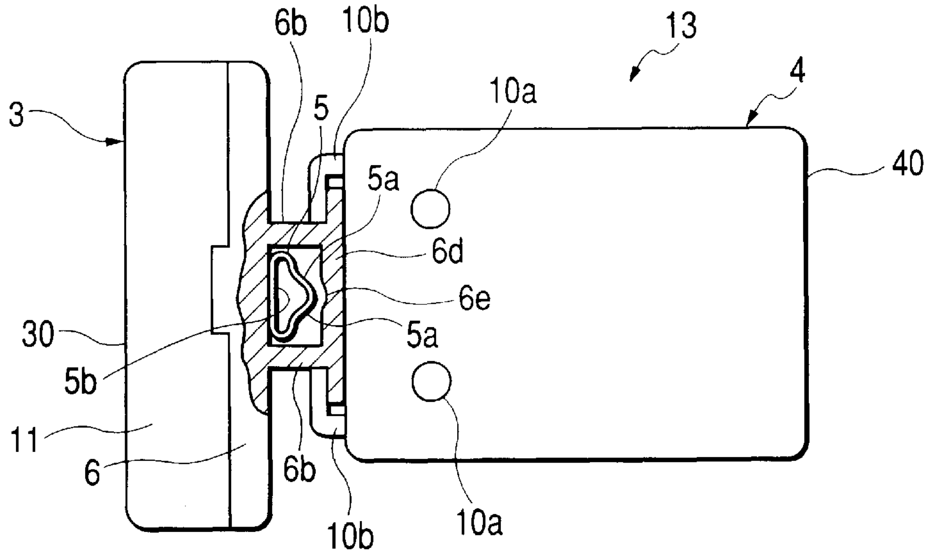
FIG. 12 is a bottom plane view of the electric power supply device of a third embodiment, according to the present invention, including a cross-section view of a part thereof.

Next, explanation will be given on a third embodiment of the present invention, by referring to FIG. 12. The FIG. 12 is a bottom plane view of the electric power supply device of the third embodiment, according to the present invention, including a cross-section view of a part thereof. However, also in this third embodiment, the structures and duplicated explanations about the portions in common with those in the first embodiment are omitted.

That according to the third embodiment, comparing to that of the first embodiment, differs therefrom in an aspect that an enclosure portion 6*d* is provided on the cover 6 of the overload protector device for enclosing the socket terminal therewith, and that the convex portion 10*c* provided on the exterior case 10 of the starter device 4 in the first embodiment is removed, however the other portions are same thereto.

This enclosure portion 6*d* is formed by connecting the connection portions 6 to each other, and it has an arc-like surface portion 6*e* being nearly coincident with the shape of the tip opening portion 5*a* of the socket terminal 5, and further, it is provided to form a gap therebetween, so that it can absorb the expansion in sizes when the pin 2*b* of the plug terminal 2 is inserted into the socket terminal 5 and it is a little bit larger than that, thereby forming a receiving portion for the tip opening portion 5*a* of the socket terminal 5. And also, this enclosure portion 6*d* is so constructed that the side surface thereof comes in contact with the side surface of the exterior case 10 of the above-mentioned starter device 4, or oppose thereto with a little gap, when the overload protector device 3 and the starter 4 are combined to be the electric power supply device 13 in one body.

With this third embodiment, it is possible to suppress the prying force occurring when the pins of the plug terminal are fitted into the socket terminals, in the same manner as in the first embodiment. Further, when the prying force is large, so as to deform the enclosure portion 6*d* of the overload protector device 3, since the side surface of the enclosure portion 6*d* abuts on the side surface of the case 10 of the starter device 4, to be prevented from the deformation thereof, it is possible to protect the enclosure portion 6d from being damaged.

Also, in the third embodiment, since only the enclosure portion 6*d* is formed at a released portion of the overload protector device, which was enclosed in three directions in the conventional socket terminal 5, it is easy to cope with. Also, the conventional one can be used as the starter device 4.

According to the present invention, it is possible to obtain an electric power supply device and an equipment using thereof, wherein while keeping superiority in work of assembling an external apparatus onto terminal pins, the prying force applied onto the opening at the tip of socket terminals of the starter device when they are fitted onto terminal pins of an external equipment can be suppressed, thereby achieving high reliability.

What is claimed is:

1. An electric power supply device, comprising:

an overload protector device; and a starter device being connected with said overload protector device, wherein:

said overload protector device has a case, in which are stored electric parts, including a bi-metal and a heater, and a socket terminal being connected to those electric parts, to be fitted with a terminal pin of an external device, wherein said socket terminal is bent from both sides to be formed in nearly triangle-like shape in cross-section thereof, and has a tip opening portion being in nearly conformity with a shape of a pin of an external terminal;

said starter device has a case, in which is stored a positive characteristic thermistor, and a pair of socket terminals being connected to said positive characteristic thermistor, to be fitted with other terminal pins of said external device; and a receiving portion is provided opposing to a tip opening. portion of the socket terminal of said overload protector device, being in nearly conformity with shape of that tip opening portion and having a little gap therebetween.

2. An electric power supply device as defined in the claim 1, wherein the socket terminal of said overload protector device is formed to be elongated, while said receiving portion is formed along with all over length of said socket terminal in longitudinal direction thereof.

3. An electric power supply device as defined in the claim 1, wherein said receiving portion is formed with portion projecting on a side surface of the case of said starter device.

4. An electric power supply device as defined in the claim 1, wherein connection portions, each being in an about "L" shape, are formed extending vertically on a side surface of the case, locating on both sides of the socket terminal of said overload protector device, wile connection portions, each being in an about "L" shape, are formed extending vertically on a side surface of the case of said starter device corresponding to the connection portions formed on the side surface of said overload protector device, and the connection portions of said overload protector device and the connection portions of said starter device are combined by sliding them in vertical direction.

5. An electric power supply device as defined in the claim 1, wherein connection portions are formed extending vertically on a side surface of the case, locating on both sides of the socket terminal of said overload protector device, and said receiving portion is formed by an enclosure portion which connects between the connection portions of said overload protector device.

6. An electric power supply device as defined in the claim 2, wherein said receiving portion is formed in a shape, so as to correspond with one side of the tip opening portion of the socket terminal, to which said projection portion formed by the portion projecting on one side surface of the case of said starter device.

7. An electric power supply device as defined in the claim 4, wherein a stopper portion is formed on at lease one of the connection portions of said overload protector device and said starter device.

8. An equipment, comprising:

a main body of the equipment having a motor therein; and an electric power supply device, to be connected with said main body of the equipment, wherein said main body of the equipment has terminal pins, and said electric power supply device is constructed by connecting an overload protector device and a starter device, wherein:

said overload protector device has a case, in which are stored electric parts, including a bi-metal and a heater, and a socket terminal being connected to those electric parts, to be fitted with a terminal pin of an external device, wherein said socket terminal is bent from both sides to be formed in nearly triangle-like in cross-section thereof and has a tip opening portion being nearly in conformity with a shape of a pin of an external terminal;

said starter device has a case, in which is stored a positive characteristic thermistor, and a pair of socket terminals being connected to said positive characteristic thermistor, to be fitted with other terminal pins of said external device; and a receiving portion is provided opposing to a tip opening portion of the socket terminal of said overload protector device, being in nearly conformity with shape of that tip opening portion and having a little gap therebetween.

* * * * *